(12) United States Patent
Hara

(10) Patent No.: US 8,155,845 B2
(45) Date of Patent: Apr. 10, 2012

(54) METHOD OF SELECTING TIRE TREAD PATTERN FOR CONSTRUCTION VEHICLE AND SYSTEM FOR SUPPORTING SELECTION OF TIRE TREAD PATTERN FOR CONSTRUCTION VEHICLE

(75) Inventor: Yuuki Hara, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 186 days.

(21) Appl. No.: 12/682,531

(22) PCT Filed: Sep. 22, 2008

(86) PCT No.: PCT/JP2008/067108
§ 371 (c)(1),
(2), (4) Date: Apr. 9, 2010

(87) PCT Pub. No.: WO2009/047975
PCT Pub. Date: Apr. 16, 2009

(65) Prior Publication Data
US 2010/0241307 A1 Sep. 23, 2010

(30) Foreign Application Priority Data

Oct. 10, 2007 (JP) .................................. 2007-264533

(51) Int. Cl.
*G01M 17/00* (2006.01)
(52) U.S. Cl. ................ 701/50; 701/29; 701/35; 73/146; 73/8; 702/34
(58) Field of Classification Search .................... 701/29, 701/35; 73/146, 8; 702/34
See application file for complete search history.

(56) References Cited

U.S. PATENT DOCUMENTS 3,933,036 A * 1/1976 Lippmann et al. .............. 73/146
5,814,718 A * 9/1998 Andresen et al. ................... 73/9
(Continued)

FOREIGN PATENT DOCUMENTS
EP 969276 A2 * 1/2000
(Continued)

OTHER PUBLICATIONS

Sensing of multiple unrelated tire parameters using electrically open circuit sensors having no electrical connections; Chuantong Wang; Woodard, S.E.; Taylor, B.D.; Sensors Applications Symposium, 2009. SAS 2009. IEEE; Digital Object Identifier: 10.1109/SAS.2009.4801795; Publication Year: 2009 , pp. 142-147.*

(Continued)

*Primary Examiner* — Cuong H Nguyen
(74) *Attorney, Agent, or Firm* — Sughrue Mion, PLLC

(57) ABSTRACT

The present invention provides a system for measuring slip rate of a tire for a construction vehicle, which system makes it possible to select based on a quantitative estimation a tire species that is the most advantageous in terms of wear resisting period among plural types of tire species having the same TKPH value and a method of selecting a tire tread pattern for a construction vehicle using the system. The system 10 for measuring slip rate of a tire for a construction vehicle includes a running position sensor 1 mounted in a construction vehicle 11, for continuously acquiring data of running position of the construction vehicle 11, a slip rate sensor 2 for continuously acquiring data of slip rate for at least one tire mounted on the construction vehicle 11, a memory 3 for storing data acquired by these sensors, and a calculation portion 5 for calculating based on the data stored in the memory 3 a slip rate distribution in which the slip rate range is divided into predetermined range sections and frequency ratios of the slip rates, measured in dry conditions at respective spots on a predetermined travelling path preset such that the construction vehicle runs, are plotted in the corresponding range sections.

7 Claims, 9 Drawing Sheets

U.S. PATENT DOCUMENTS

| | | | |
|---|---|---|---|
| 5,892,139 A * | 4/1999 | Miyazaki | 73/9 |
| 5,948,961 A * | 9/1999 | Asano et al. | 73/9 |
| 6,269,690 B1 * | 8/2001 | Shimizu et al. | 73/146 |
| 6,374,886 B1 * | 4/2002 | Eromaki | 152/210 |
| 7,483,794 B2 * | 1/2009 | Bocquillon et al. | 702/34 |
| 7,908,917 B2 * | 3/2011 | Kitagawa et al. | 73/146 |
| 2006/0156790 A1 * | 7/2006 | Bocquillon et al. | 73/8 |
| 2008/0078488 A1 * | 4/2008 | Yoda | 152/209.26 |
| 2010/0037686 A1 * | 2/2010 | Kitagawa et al. | 73/146 |
| 2010/0241307 A1 * | 9/2010 | Hara | 701/35 |

FOREIGN PATENT DOCUMENTS

| | | | |
|---|---|---|---|
| EP | 1429135 B1 * | 1/2006 | |
| EP | 2154507 A2 * | 2/2010 | |
| FR | 03/07374 * | 6/2003 | |
| JP | 07-334786 A | 12/1995 | |
| JP | 2000-289417 A | 10/2000 | |
| JP | 2006-259975 A | 9/2006 | |
| JP | 2004-341738 * | 5/2007 | |
| WO | PCT/EP2004/006331 * | 6/2004 | |

OTHER PUBLICATIONS

S E. Woodard and B. D. Taylor, Magnetic Field Response Measurement; Acquisition System, US Patent 7159774B2, 2007.*

M Sergio, N Manaresi, M Tartagni, R Canegallo and R Guerrieri, On a road tire deformation measurement system using a capacitive-resitive sensor, Smart Materials and Structures, vol. 15, 2006, pp. 1700-1706.*

R. Matsuzaki and A. Todoroki, Wireless strain monitoring of tires using electrical capacitance changes with an oscillating circuit, Sensor and Acuators A vol. 119, 2005, pp. 323-331.*

International Search Report of PCT/JP2008/067108 dated Nov. 4, 2008.

* cited by examiner

METHOD OF SELECTING TIRE TREAD PATTERN FOR CONSTRUCTION VEHICLE AND SYSTEM FOR SUPPORTING SELECTION OF TIRE TREAD PATTERN FOR CONSTRUCTION VEHICLE

TECHNICAL FIELD

The present invention relates to a method of, for each construction vehicle to be controlled, selecting a tread pattern which is the most advantageous in terms of wear resisting period among plural different tread patterns of tire species having different volumes to be worn and each mountable to the vehicle, and also a system for supporting selection of a tire tread pattern for a construction vehicle for use in the method.

In a dig site in a mine or the like, ores collected in a digging point are transferred to an ore-collecting point and waste generated during digging is carried to a discard point by using a super-large construction vehicle. A travelling path on which such a construction vehicle as described above runs is provided and continually maintained as a fixed path. In the present invention, a travelling path preset such that respective construction vehicles run thereon will be referred to as a "registered travelling path" hereinafter.

Regarding a tire to be mounted to such a construction vehicle as described above, any tire of which size matches the rim of the vehicle can basically be mounted to the vehicle. Therefore, quite often selection can be made among plural tire species having the same size and different internal structures, tread patterns and the like. What is important in such selection of a tire species is, first of all, that the tire species is capable of performing relatively large conveyance mechanical work within a range not exceeding the heat generation limit under harsh running conditions, i.e. the tire species has sufficiently large TKPH or an accumulation value of product of tire's load and running speed and, secondly, that the tire species exhibits good wear resistance for a sufficiently long period. In the present invention, "tire's load" represents an average value of load applied to a tire when the vehicle is empty and load applied to the tire when the vehicle is having load thereon.

Regarding conveyance mechanical work, the TKPH value of each tire species is shown in the specification thereof. A construction vehicle running on a registered travelling path having harsh running conditions requires a relatively high TKPH value and thus a tire species having a TKPH value higher than this necessitated TKPH value should be selected.

Regarding the period during which a tire exhibits good wear resistance (which period will be referred to as "wear resisting period" hereinafter), it has been conventionally practiced that the volume of land portions (protruding portions) which are most susceptible to wear is ensured by reducing the volume of groove portions (recessed portions) in a tread pattern, with scarifying traction performance to some extent, in order to compete with wear as a whole. However, it is now known that, for example, in a case where a construction vehicle runs under wet conditions, an amount of wear due to high degree of slip can actually be decreased and a wear resisting period can be prolonged by rather increasing the volume of groove portions and enhancing traction performance. As a result, it has been started to sell plural types of tire species having the same TKPH but different volume ratios of land portions and groove portions in tread patterns thereof.

DISCLOSURE OF INVENTION

Problems to be Solved by the Invention

In such a situation as described above, which tire species to be chosen among plural types of tire species each mountable to a construction vehicle and having tread patterns of the same TKPH value is conventionally determined based on intuition and experience of the operator and therefore there is no guarantee that the selected tire species is the best choice.

The present invention has been contrived in view of the problem described above, and an object thereof is to provide a method of selecting a tire tread pattern for a construction vehicle, which method makes it possible to select based on a quantitative estimation a tread pattern that is the most advantageous in terms of wear resisting period among plural types of tire species having the same TKPH value and a system for supporting selection of a tire tread pattern for a construction vehicle for use in the method.

Means for Solving the Problem

In a first aspect <1> of the present invention, a method of, for each construction vehicle to be controlled, selecting a tread pattern which is the most advantageous in terms of wear resisting period among plural different tread patterns of tire species having different volumes to be worn and each mountable to the vehicle, comprises: step A of making a vehicle, having a running position sensor for acquiring running position data and a slip rate sensor for acquiring slip rate data for at least one tire mounted thereon, run on a "registered travelling path" preset such that the vehicle runs thereon, acquiring data of a position and data of a slip rate at the position regarding plural positions on the registered travelling path, and calculating, based on the data thus acquired, a "degree of road surface slip" which represents degree at which slip is likely to occur on the registered travelling path; step B of setting a table which correlates a degree of road surface slip of the registered travelling path, with a tread pattern which is the most advantageous in terms of wear resisting period when the vehicle runs on the registered travelling path, the tread pattern being determined depending on the degree of road surface slip; and step C of applying the degree of road surface slip calculated at step A to the table to select a tread pattern which is the most advantageous in terms of wear resisting period, wherein, upon setting the table at step B, a tread pattern having a relatively small volume to be worn is correlated, as the most advantageous tread pattern in terms of wear resisting period, with a registered travelling path having a relatively high degree of road surface slip, and a tread pattern having a relatively large portion to be worn is correlated with a registered travelling path having a relatively low degree of road surface slip.

In a second aspect <2> of the present invention, the method of selecting a tire tread pattern for a construction vehicle of the first aspect <1> is characterized in that the degree of road surface slip is represented by a "slip rate distribution" in which the slip rate range is divided into plural range sections and frequency ratios of the spots on the travelling path corresponding to the respective range sections are plotted therein.

In a third aspect <3> of the present invention, the method of selecting a tire tread pattern for a construction vehicle of the second aspect <2> is characterized in that the slip rate range is divided into two ranges comprising a range in which the absolute value of the slip rate does not exceed 5% and a range in which the absolute value of the slip rate exceeds 5%.

In a fourth aspect <4> of the present invention, the method of selecting a tire tread pattern for a construction vehicle of the first aspect <1> is characterized in that the degree of road surface slip is represented by the total sum of areas surrounded, in graph where distances between the starting point and respective spots on the registered travelling path are plotted on the X-axis and respective slip rates measured at the respective spots on the registered travelling path are plotted on the Y-axis, by the line where the slip rate is zero and a line graph of change in the slip rate drawn by linking the plotted respective slip rates (which total sum will be referred to as "accumulated slip rate" hereinafter).

In a fifth aspect <5> of the present invention, the method of selecting a tire tread pattern for a construction vehicle of any of the first <1> to fourth <4> aspects is characterized in that the running position data and the slip rate data are continuously acquired with a predetermined time interval in a manner synchronous with each other.

In a sixth aspect <6> of the present invention, a system for use in the method of selecting a tire tread pattern for a construction vehicle of any of the first <1> to fifth <5> aspects, comprises: a running position sensor mounted on the vehicle, for acquiring running position data of the vehicle; a slip rate sensor for acquiring slip rate data of at least one tire mounted on the construction vehicle; a memory for storing data acquired from these sensors; and a calculation portion for calculating the degree of road surface slip, based on the data stored in the memory.

In a seventh aspect <7> of the present invention, the system for supporting tire tread pattern selection for a construction vehicle of the sixth <6> aspect is characterized in that the memory is adapted to store data of the table and the calculation portion is adapted to select a tread pattern which is the most advantageous in terms of wear resisting period, on the basis of the degree of road surface slip and the table.

Effect of the Invention

According to the first aspect <1>, the method includes: step A of calculating a "degree of road surface slip" of a registered travelling path to be targeted; step B of setting a table which correlates a degree of road surface slip of the registered travelling path with a tread pattern which is the most advantageous in terms of wear resisting period when the vehicle runs on the registered travelling path; and step C of applying the degree of road surface slip calculated at step A to the table to select a tread pattern which is the most advantageous in terms of wear resisting period, wherein, upon setting the table, a tread pattern having a relatively small volume to be worn is correlated, as the most advantageous tread pattern in terms of wear resisting period, with a registered travelling path having a relatively high degree of road surface slip, and a tread pattern having a relatively large portion to be worn is correlated with a registered travelling path having a relatively low degree of road surface slip. For example, in a case of a travelling path having a lot of rises where tires experience severe slip, there is selected from the table a tread pattern having a relatively large area of groove portions therein, excellent in traction and thus capable of suppressing slip, although the tread pattern has a relatively small volume to be worn, as a tread pattern corresponding to the travelling path having a relatively high degree of road surface slip. In contrast, in a case of a registered travelling path where dry and flat roads are dominant, a tread pattern having a relatively large volume to be worn can be selected as a tread pattern corresponding to the registered travelling path having a relatively low degree of road surface slip, although an area of groove portions is relatively small and thus traction performance is sacrificed to some extent. As a result, a tread pattern which is the most suitable for the registered travelling path in terms of wear resisting period can be selected.

According to the second aspect <2>, the degree of road surface slip is represented by a "slip rate distribution" in which the slip rate range is divided into plural range sections and frequency ratios of the spots on the travelling path corresponding to the respective range sections are plotted therein. Selection of a tread pattern can be accurately carried out by using the aforementioned slip rate distribution as the degree of road surface slip.

According to the second aspect <3>, the slip rate range is divided into two ranges comprising a range in which the absolute value of the slip rate does not exceed 5% and a range in which the absolute value of the slip rate exceeds 5%. Therefore, selection of a tire species advantageously having a long wear resisting period can be made in a very simple, easy and more accurate manner.

According to the second aspect <4>, the degree of road surface slip is represented by the accumulated slip rate defined as described above. Selection of a tread pattern can be made in a simple and easy manner by using this accumulated slip rate as the degree of road surface slip.

According to the second aspect <5>, the running position data and the slip rate data are continuously acquired with a predetermined time interval in a manner synchronous with each other. As a result, the degree of road surface slip can be calculated more precisely than otherwise.

According to the second aspect <6>, the system for use in the method of selecting a tire tread pattern for a construction vehicle comprises: a running position sensor mounted on the vehicle, for acquiring running position data of the vehicle; a slip rate sensor for acquiring slip rate data of at least one tire mounted on the construction vehicle; a memory for storing data acquired from these sensors; and a calculation portion for calculating the degree of road surface slip, based on the data stored in the memory. Therefore, the degree of road surface slip can be calculated for the registered travelling path automatically by a simple device.

According to the second aspect <7>, the calculation portion is adapted to select a tread pattern which is the most advantageous in terms of wear resisting period, on the basis of the degree of road surface slip and the table. Therefore, selection of a tread pattern which is the most advantageous in terms of wear resisting period of a tire can also be carried out automatically.

EXPLANATION OF REFERENCE NUMERALS

Figure 1:
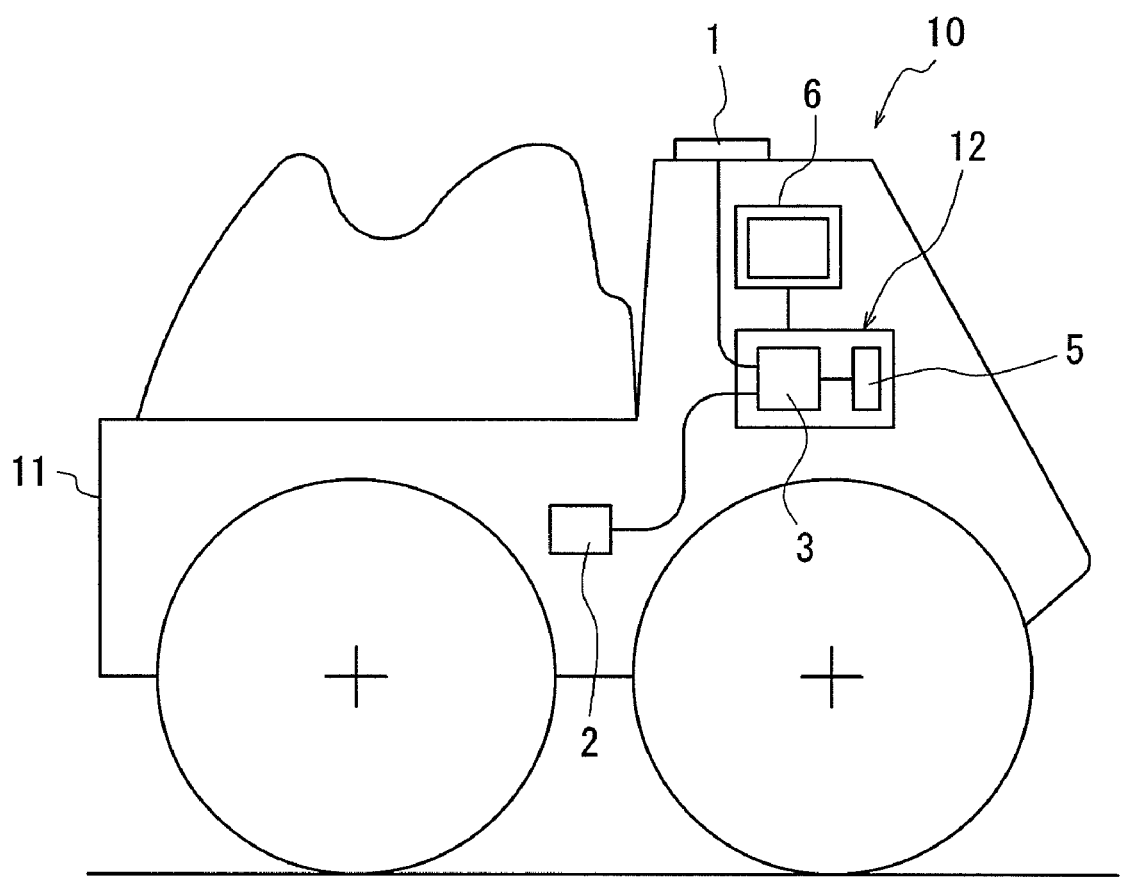
FIG. 1 is a schematic view showing a structure of a tire slip rate measuring system for a construction vehicle according to an embodiment of the present invention.

1 Running position sensor
2 Slip rate sensor
3 Memory
5 Calculation portion
6 Display portion
10 System for supporting tire selection of tread pattern for a construction vehicle
11 Construction vehicle
12 Computer mounted on vehicle
M0 Registered travelling path
M1, M2, M3 Travelling path portions

BEST MODE FOR IMPLEMENTING THE INVENTION

FIG. 1 is a schematic view showing a structure of a system for supporting selection of a tire tread pattern for a construction vehicle, which system is used in a method of selecting a tire tread pattern for a construction vehicle according to a first embodiment of the present invention. A system 10 for supporting selection of a tire tread pattern for a construction vehicle includes, in a construction vehicle 11, a running position sensor 1 for continually acquiring data of running position of the construction vehicle 11, a slip rate sensor 2 for continually acquiring data of slip rate for at least one tire mounted on the construction vehicle 11, a memory 3 for storing data acquired by these sensors 1 and 2, and a calculation portion 5 for calculating a degree of road surface slip on the basis of the data read out from the memory 3, which degree of road surface slip represents a degree at which slip is likely to occur in a "registered travelling path" preset such that the vehicle 11 runs thereon.

The system 10 for supporting selection of a tire tread pattern for a construction vehicle includes, in addition to the aforementioned components, a display portion 6 for displaying the registered travelling path, the degree of road surface slip mapped on the registered travelling path, graphics as the results of analysis, and the like.

Examples of the memory 3 include a semiconductor memory or HDD provided in a computer 12 mounted on the vehicle. In this case, a part of the computer 12 can be made to function as the calculation portion 5. Further, a display connected to the computer 12 can be used as the display portion 6.

In place of the aforementioned structure, a computer provided in a laboratory can be used as the calculation portion 5. In this case, a USB memory or a removable HDD connectable to the computer 12 mounted on the vehicle is used as the memory 3. The memory 3 storing data of the running vehicle is then removed from the computer 12 mounted on the vehicle and connected to the computer provided in a laboratory or the like.

In the present embodiment, a sensor utilizing GPS (Global Positioning System) can be used as the running position sensor 1. In this case, continuous position acquisitions of the running construction vehicle can be carried out in a simple and easy manner.

A slip rate of a tire is calculated as (the vehicle speed of the construction vehicle 11—the speed of the peripheral surface of the tire)/the vehicle speed. Accordingly, a slip rate sensor may be constituted of a vehicle speed sensor for measuring the vehicle speed, a tire peripheral speed sensor for measuring the speed of the peripheral surface of a tire, and a control portion for calculating the slip rate based on the data from these sensors. In this case, acceptable examples of the tire peripheral speed sensor include an apparatus adapted to irradiate a lug position of a tire having a lug pattern with laser beam or the like, process reflected beam of trapezoidal waves each formed due to difference in distance from the laser beam source between a lug portion and a groove portion, which portions alternately pass by the sensor as the tire is rotated, and calculate the speed of the tire peripheral surface from the cycles of trapezoidal waves and the known lug pitches.

Hereinafter, there will be described a method of, for each construction vehicle to be controlled, selecting a tread pattern which is the most advantageous in terms of wear resisting period among plural different tread patterns of tire species having different volumes to be worn and each mountable to the vehicle by using the system 10 for supporting selection of a tire tread pattern for a construction vehicle structured as described above.

The method includes: step A of making a vehicle 11, having a running position sensor 1 for acquiring running position data and a slip rate sensor 2 for acquiring slip rate data for at least one tire mounted thereon, run on a registered travelling path preset such that the vehicle runs thereon, acquiring data of a position and data of a slip rate at the position regarding plural positions on the registered travelling path, and calculating on the data thus acquired a "degree of road surface slip" which represents degree at which slip is likely to occur on the registered travelling path; step B of setting a table which correlates a degree of road surface slip of the registered travelling path, with a tread pattern which is the most advantageous in terms of wear resisting period when the vehicle runs on the registered travelling path; and step C of selecting a tire species having a tread pattern which is the most advantageous in terms of wear resisting period, on the basis of the degree of road surface slip calculated at step A, wherein, upon setting the table at step B, a tread pattern having a relatively small volume to be worn is correlated, as the most advantageous tread pattern in terms of wear resisting period, with a registered travelling path having a relatively high degree of road surface slip, and a tread pattern having a relatively large portion to be worn is correlated with a registered travelling path having a relatively low degree of road surface slip. In the first embodiment, the "degree of road surface slip" is represented by a slip rate distribution in which the slip rate range is divided into plural range sections (e.g. a range in which the absolute value of the slip rate does not exceed 5% and a range in which the absolute value of the slip rate exceeds 5%) and frequency ratios of the spots on the travelling path corresponding to the respective range sections are plotted therein. Step A, step B and step C will be described in detail in this order hereinbelow.

Figure 2:
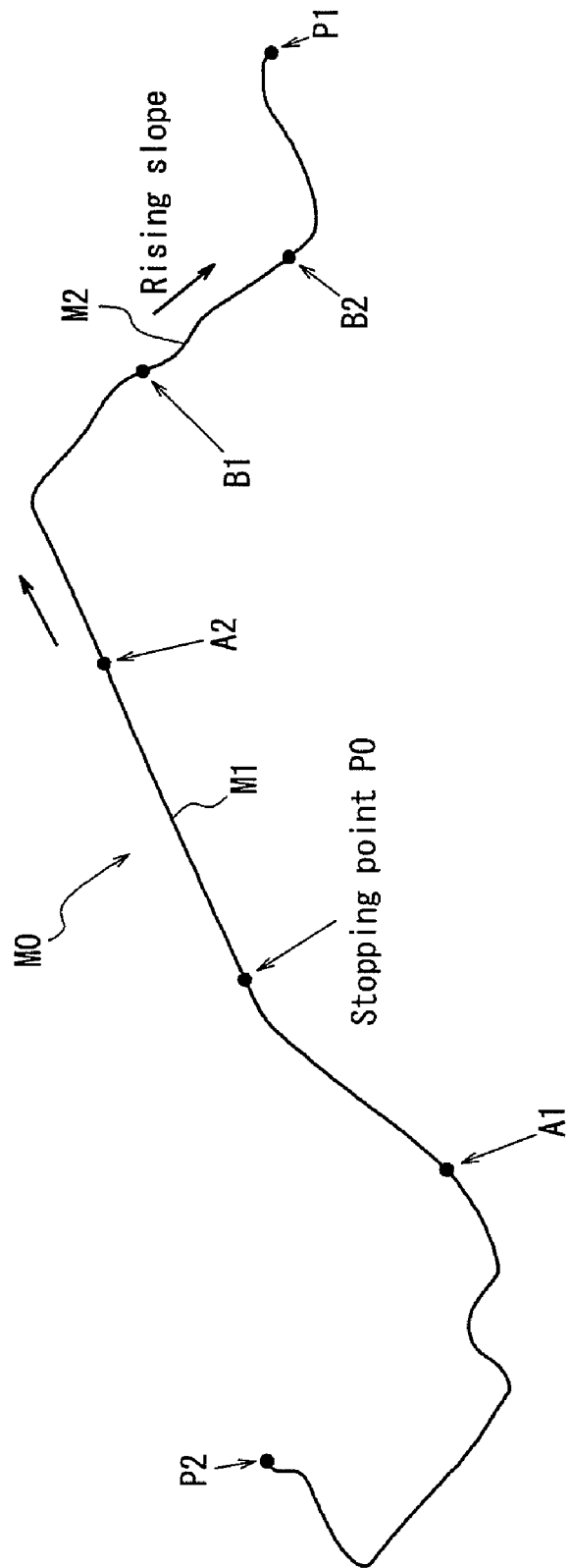
FIG. 2 is a path diagram exemplarily showing a registered travelling path of a construction vehicle.

FIG. 2 shows an example of a display image displayed by the display portion 6. This display image shows a registered travelling path M0 of one construction vehicle 11 to be controlled.

The running position sensor 1 can continuously acquire a position in the latitudinal direction x(t), a position in the longitudinal direction y(t) and a height h(t) with a predetermined time interval, e.g. $\Delta t$, along a travelling path on which the vehicle 11 has run. Accordingly, a travelling path can be graphically expressed from the obtained data by plotting the coordinates P(x(t), y(t)) on a horizontal plane at time t=t0, t0+$\Delta$t, t0+2$\Delta$t, . . . on the display portion 6. FIG. 2 is the one-way running portion M0 of the registered travelling path corresponding to the one construction vehicle 11, thus graphically expressed.

The construction vehicle 11 starts from the stopping point P0, travels toward point P1, turns back at point P1 to return to point P0. The construction vehicle 11 then travels toward point P2, turns back again at point P2 and returns to point P0. The one-way travelling path portion M0 shown in FIG. 2 is a portion including a path from point P2 to P0 and a path from point P0 to point P1, of the aforementioned outward and return travel paths.

Figure 3:
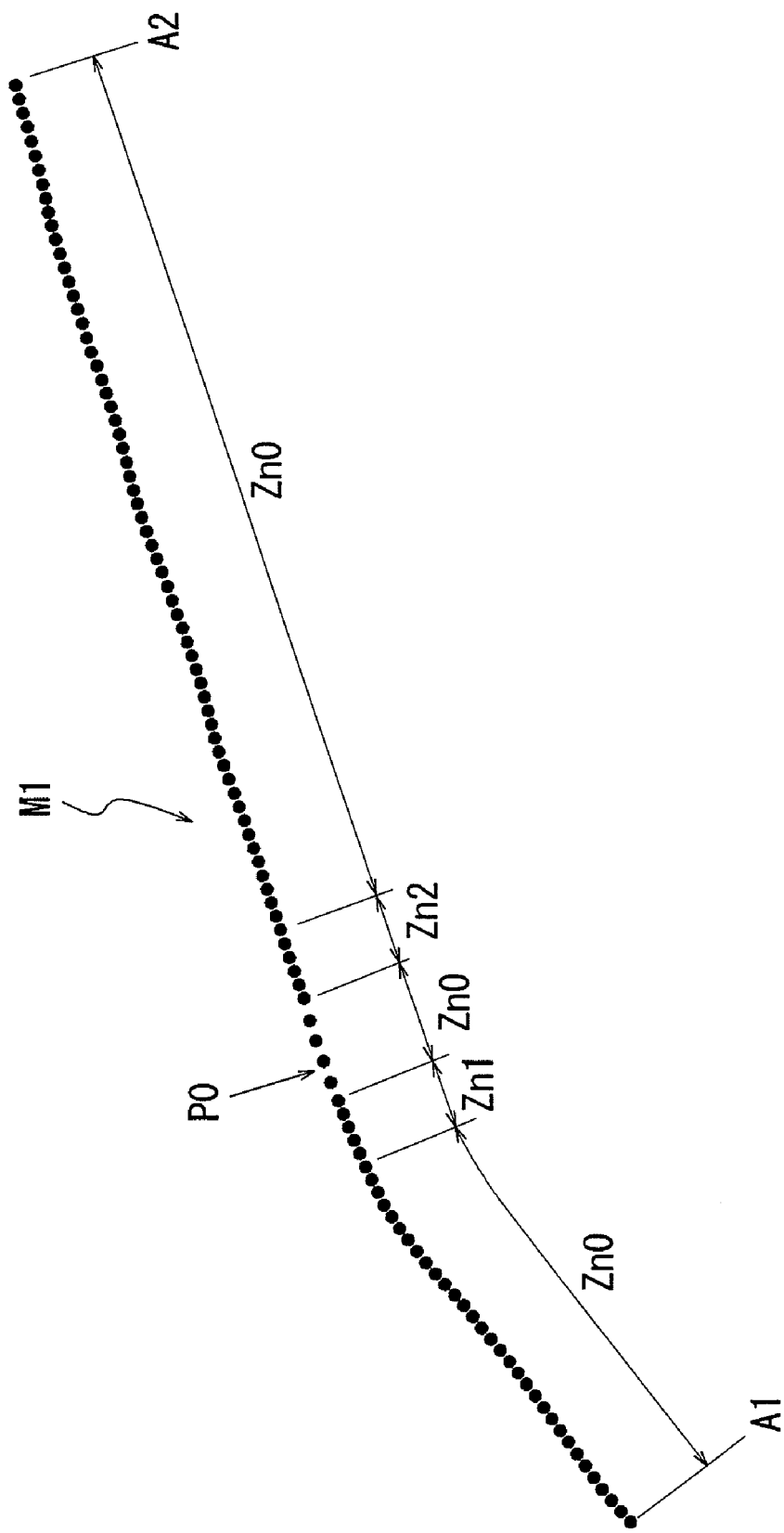
FIG. 3 is a schematic view showing a portion of the registered travelling path in an enlarged manner.
Figure 4:
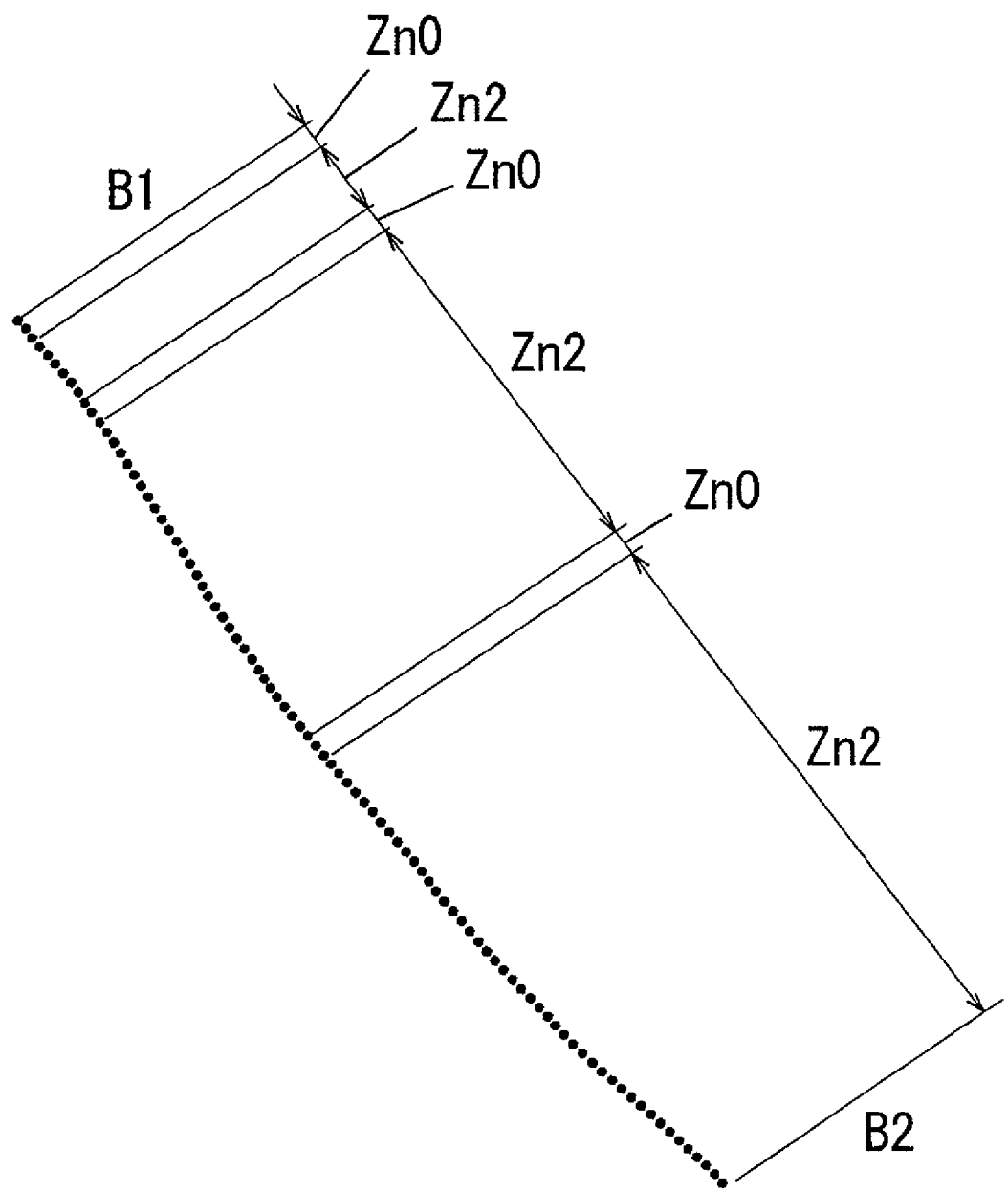
FIG. 4 is a schematic view showing another portion of the registered travelling path in an enlarged manner.

Explanation is continued hereinafter with reference to FIG. 3 showing in an enlarged manner a substantially flat portion M1 from A1 to A2, which portion is cut out from the one-way travelling path portion M0, and FIG. 4 showing an enlarged manner a portion M2 including a steep rise from point B1 to B2.

The slip rate sensor 2 mounted on the construction vehicle 11 is adapted to continuously acquire the slip rate data s(t) for at least one tire of the tires mounted on the vehicle at time $t=t0, t0+\Delta t, t0+2\Delta t, \ldots$ on, for example, synchronous with acquisition of the running position data obtained by the running position sensor 1, whereby it is possible to find out the slip rate $s(t0+i\Delta t)$ of the tire at each of the respective coordinates $P(x(t0+i\Delta t), y(t0+i\Delta t))$ on a horizontal plane from the coordinates $P(x(t), y(t))$ on a horizontal plane of the portion M1 and the slip rate data s(t) at time t. In FIG. 3, the range in which the absolute value of the slip rate s(t) does not exceed 5% is expressed as Zn0, the range in which the slip rate s(t) exceeds 5% is expressed as Zn1, and the range in which the slip rate is smaller than −5% is expressed as Zn2 on the basis of the slip rate $s(t0+i\Delta t)$ (i=1, 2, 3, . . . ) thus obtained. Accordingly, the total travel distances can be known for the ranges Zn0, Zn1 and Zn2, respectively.

Similarly, the total travel distances can be known for the ranges Zn0, Zn1 and Zn2, respectively, for the portion M2, as well. It is understood that the portion M2, mostly constituted of rising slopes, hardly has the range Zn1 and the most of the parts thereof are occupied by Zn2.

Figure 5:
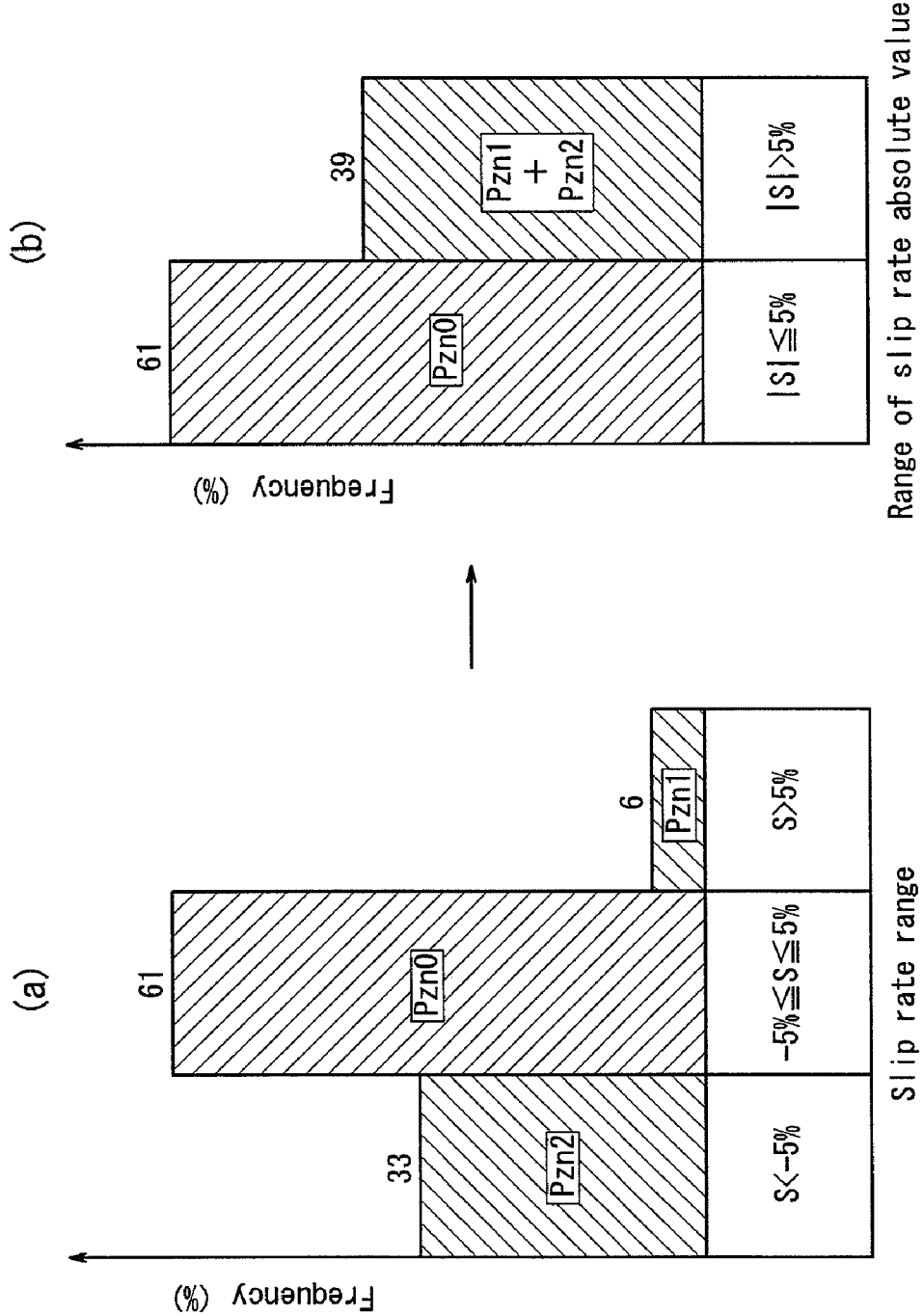
FIGS. 5(a) and 5(b) are graphs each showing an example of slip rate distribution.

FIG. 5(a) is a graph representing the slip rate distribution in which the frequency ratios of the spots on the registered travelling path M0 are plotted in the corresponding respective slip rate range sections. The frequency ratio Pzn0 of the range Zn0 in which the absolute value of the slip rate s(t) does not exceed 5% is 61%, the frequency ratio Pzn1 of the range Zn1 in which the slip rate s(t) exceeds 5% is 6%, and the frequency ratio Pzn2 of the range Zn2 in which the slip rate s(t) is smaller than −5% is 33%. FIG. 5(b) is another graph of the slip rate distribution, in which the respective slip rate ranges of the range sections of FIG. 5(a) have been converted into absolute values and the range sections thus converted are integrated accordingly. The frequency ratio Pzn0 of the range Zn0 in which the absolute value of the slip rate s(t) does not exceed 5% is 61%, and the frequency ratios (Pzn1+Pzn2) of the ranges (Zn1+Zn2) in which the absolute values of the slip rates s(t) exceed 5% are 39% in sum.

Figure 6:
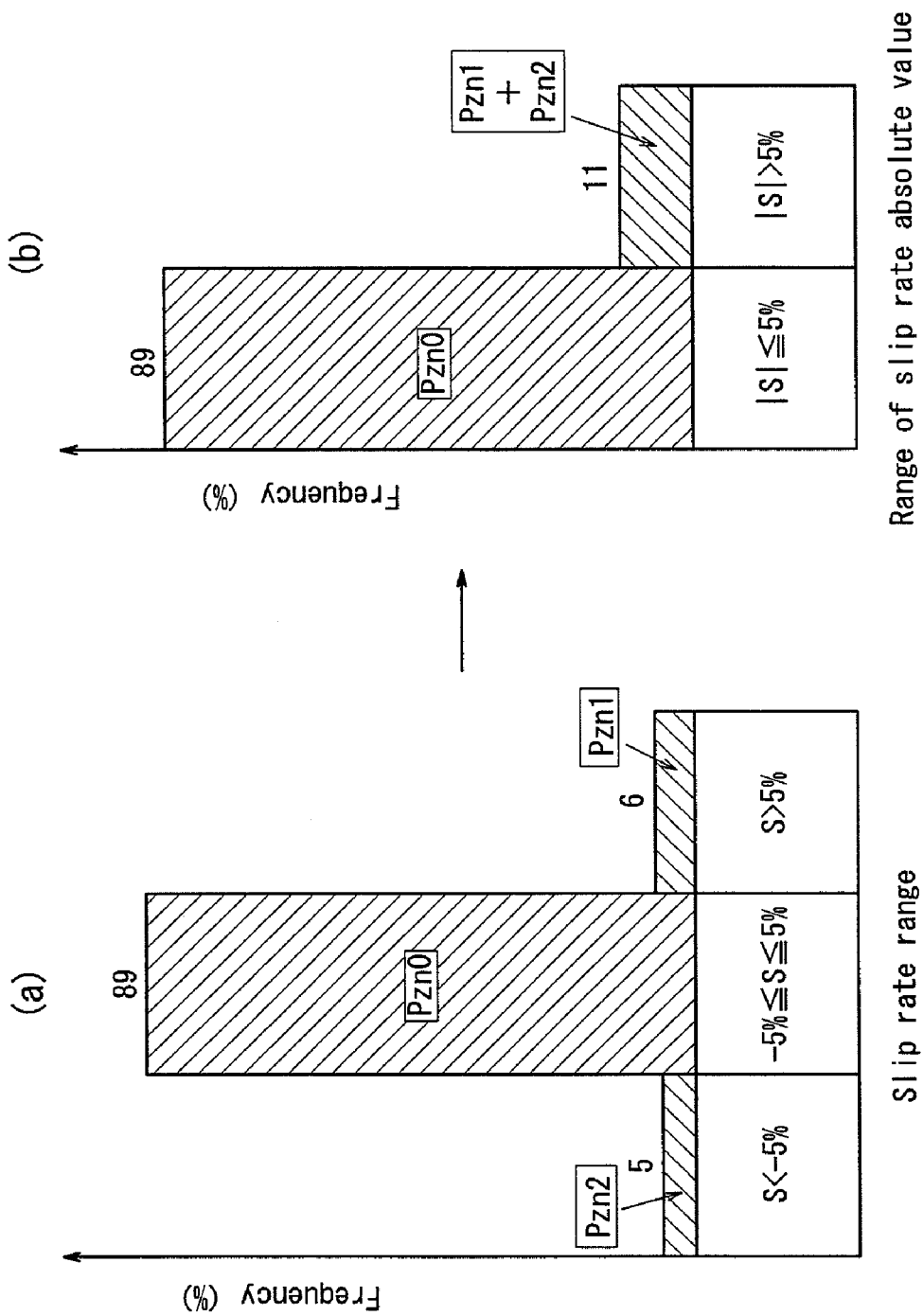
FIGS. 6(a) and 6(b) are graphs each showing another example of slip rate distribution.

In contrast, FIG. 6(a) shows a slip rate distribution of a registered travelling path which is mostly constituted of flat roads, for comparison with the slip rate distribution shown in FIG. 5(a). In the slip rate distribution of FIG. 6(a), the frequency ratio Pzn0 of the range Zn0 is 89%, the frequency ratio Pzn1 of the range Zn1 is 6%, and the frequency ratio of Pzn2 of the range Zn2 is 5%. Further, in the slip rate distribution in which the respective slip rate ranges of the range sections of FIG. 6(a) have been converted into absolute values and the range sections thus converted are integrated accordingly, the frequency ratio Pzn0 of the range Zn0 is 89% and the frequency ratios (Pzn1+Pzn2) of the ranges (Zn1+Zn2) are 11% in sum, as shown in FIG. 6(b).

Figure 7:
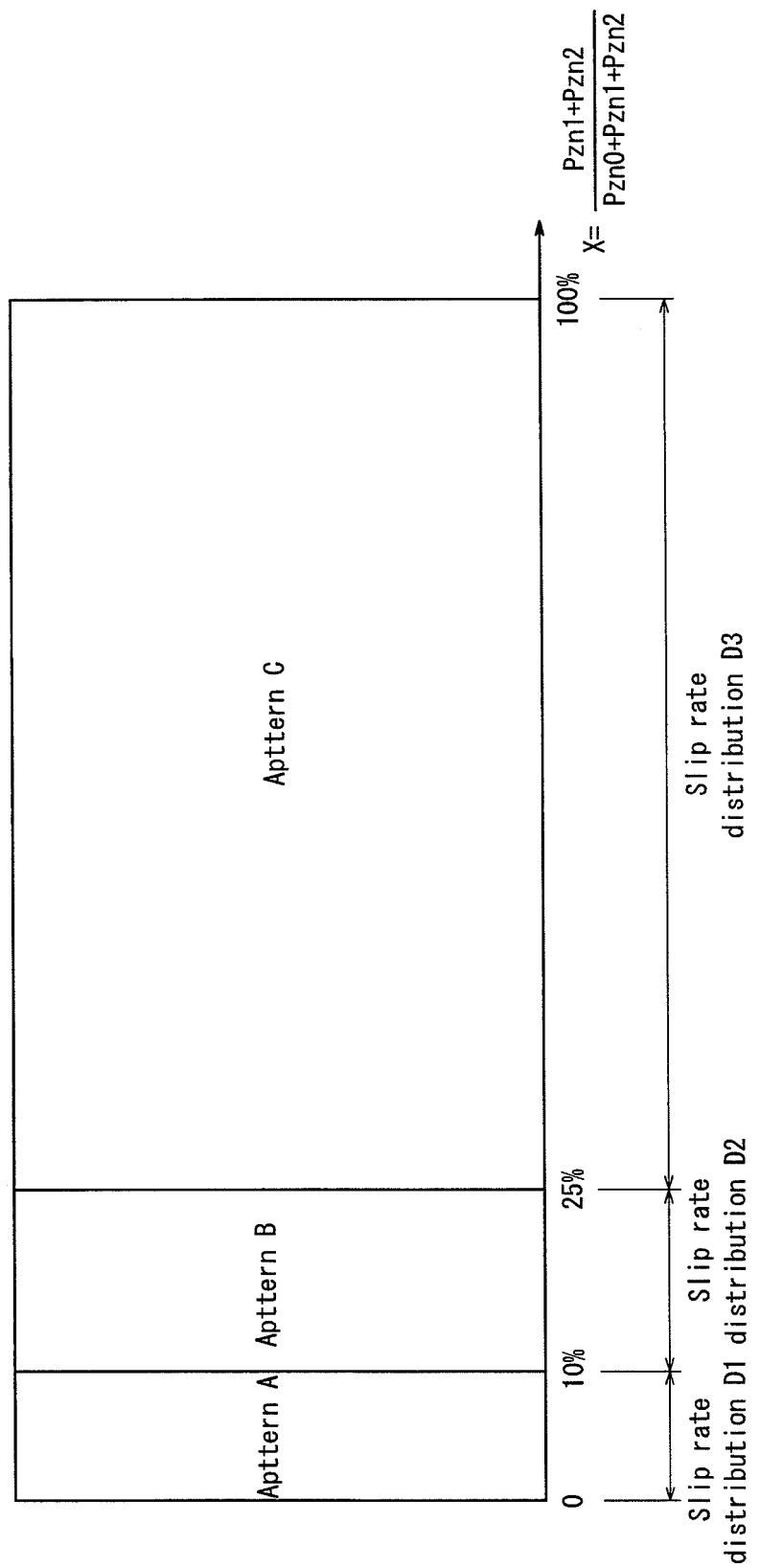
FIG. 7 is a view exemplarily showing a table which correlates each of respective slip rate distributions of the registered travelling path, with a tire species having a tread pattern achieving longest wear resisting period in the distribution, the tire species being selected from plural types of tire species each mountable to the construction vehicle which runs on the registered travelling path.

In step A, a slip rate distribution is calculated for the registered travelling path M0 as described above. Prior to step A, there is prepared in step B a table for, when the slip rate distribution for the registered travelling path is changed, teaching which of plural types of tire species having different tread patterns and each mountable to the construction vehicle 11 would achieve the longest wear resisting period, as compared with other tire species, for which range section of the slip rate distribution. FIG. 7 is a view showing such a table as described above. In the example shown in FIG. 7, the tire species having pattern A as a tread pattern thereof would exhibit the longest wear resisting period for a registered travelling path having a slip rate distribution D1 in which the frequency percentage, of the range section where the absolute value of the slip rate s(t) exceeds 5%, is less than 10%; the tire species having pattern B as a tread pattern thereof would exhibit the longest wear resisting period for a registered travelling path having a slip rate distribution D2 in which the frequency percentage, of the range section where the absolute value of the slip rate s(t) exceeds 5%, is in the range of 10 to 25%; and the tire species having pattern C as a tread pattern thereof would exhibit the longest wear resisting period for a registered travelling path having a slip rate distribution D3 in which the frequency percentage, of the range section where the absolute value of the slip rate s(t) exceeds 5%, is larger than 25%.

A graph as shown in FIG. 7 can be obtained as described below. First, a wear resisting period M of a tire is obtained by using formula (1) for each of plural tires having different tread patterns and each mounted to a construction vehicle to be controlled.

$$M = \frac{TV}{f(W) \cdot (s1 \cdot r1 + s2 \cdot r2)} \quad (1)$$

In formula (1), f(W) represents quantity proportional to load exerted on a tire and, practically, the maximum load exerted on the tire can be used for f(W); r1 and r2 represent frequency percentage of the slip rate not exceeding 5% and frequency percentage of the slip rate exceeding 5%, respectively, in the total distance of a travelling path; s1 and s2, which are constants, are set based on experiments as a wear rate when the construction vehicle runs at a slip rate of which absolute value does not exceed 5% (wear amount per unit time) and a wear rate when the construction vehicle runs at a slip rate of which absolute value exceeds 5% (wear amount per unit time), respectively.

Further, TV represents an amount which could be worn during the entire product life of a tire and may be expressed by formula (2) below.

$$TV = \pi \cdot OD \cdot TW \cdot OTD \cdot (1-NG) \quad (2)$$

wherein OD: tire outer diameter (mm)

TW: tire width (mm)

OTD: groove depth (mm) in the brand new state

NG: negative ratio, i.e. ratio of groove area with respect to tread surface

Figure 8:
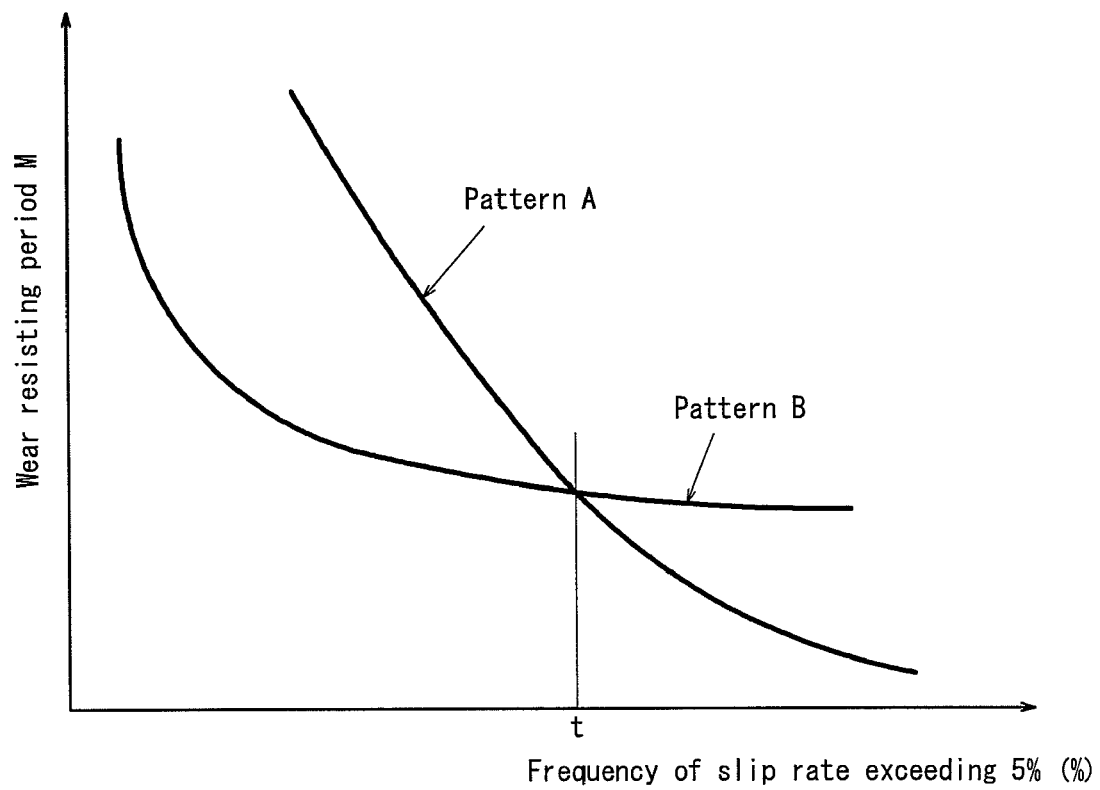
FIG. 8 is a graph schematically showing a relationship between the frequency percentage at which the slip rate exceeding 5% occurs and the wear resisting period for two types of tire species each mountable to the construction vehicle.

In FIG. 8, curve A is a graph representing dependency of wear resisting period of a tire species having pattern A where the volume of groove portions is relatively small and the volume TV which could be worn is relatively large in the tread pattern, with respect to the frequency percentage of the slip rate exceeding 5%, while curve B is a graph representing dependency of wear resisting period of a tire species having pattern B where the could-be-worn volume TV is smaller than pattern A and the volume of groove portions is larger than pattern A accordingly, with respect to the frequency percentage of the slip rate exceeding 5%. Although the tire species having pattern B has a could-be-worn volume TV smaller than that of the tire species having pattern A, the tire species having pattern B exhibits a lower wear rate s2 when a construction vehicle runs at a slip rate of which absolute value exceeds 5%, whereby the curves A and B as shown in FIG. 8 are resulted. In short, according to the graphs in FIG. 8, the table described above can be prepared such that the tire species having pattern A is advantageous in terms of wear resisting period in a case where the frequency percentage (%) of running at a slip rate of which absolute value exceeds 5% is equal to or less than t(%), while the tire species having pattern B is advantageous in a case where the aforementioned frequency percentage exceeds t(%).

Step C is a step of selecting a tire species which would be the most advantageous in terms of wear resisting period. In this step, for example, a tire species having pattern C as a tread pattern thereof is specified according to the table of FIG. 7 as the most advantageous tire species in a case shown in FIG. 5(b) where the frequency percentage of the slip rate exceeding 5% is 39%. A tire species having pattern B as a tread pattern thereof is specified according to the table of FIG. 7 as the most advantageous tire species in a case shown in FIG. 6(b) where the frequency percentage of the slip rate exceeding 5% is 11%. Accordingly, the most advantageous tire in terms of wear resisting period can be selected.

Next, a method of selecting a tire tread pattern for a construction vehicle according to a second embodiment of the present invention will be described. The present embodiment is the same as the first embodiment in using the system 10 for supporting selection of a tire tread pattern for a construction vehicle, previously described with reference to FIG. 1. The second embodiment differs from the first embodiment in that an accumulated slip rate is employed as the degree of road surface slip in place of a slip rate distribution of the first embodiment. Use of an accumulated slip rate as the degree of road surface slip will be described hereinafter.

Figure 9:
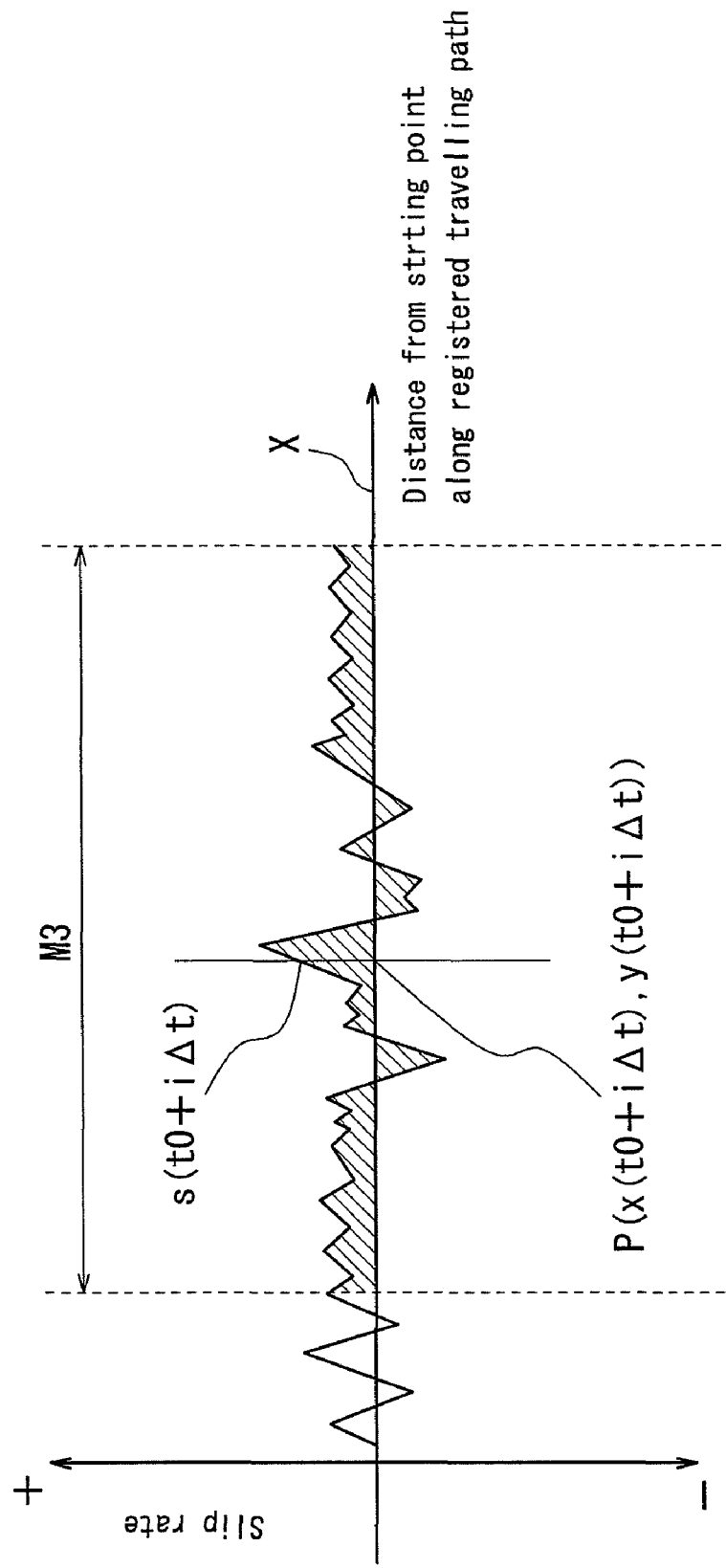
FIG. 9 is a graph schematically showing change in the slip rate for a portion M3 of the registered travelling path.

FIG. 9 schematically shows changes in slip rate, with regard to the portion M3 of the registered travelling path. The X axis represents the distance measured along the travelling path from the starting point thereof to the coordinate $P(x(t0+i\Delta t), y(t0+i\Delta t))$ on a horizontal plane obtained from the running position data acquired at time $t(0+i\Delta)$ $(i=1, 2, 3, \ldots)$. The Y axis represents the slip rate $s(t0+i\Delta t)$ of the tire at the coordinate $P(x(t0+i\Delta t), y(t0+i\Delta t))$. The line graph Q, obtained by linking the slip rate $s(t0+i\Delta t)$ values of the tire sequentially measured for $(i=1, 2, \ldots)$, is referred to as "line graph of change in slip rate". An accumulated slip rate is defined as the area of a portion surround by the line graph Q of change in slip rate and a line representing that the slip rate is zero (i.e. the X axis) in FIG. 9 (the area of the hatched portion in FIG. 9). On this basis, the second embodiment characteristically uses an accumulated slip rate thus obtained as the degree of road surface slip.

In the present embodiment employing an accumulated slip rate as the degree of road surface slip, an accumulated slip rate is calculated based on the running position data and the slip rate data acquired for the entire portions of the registered travelling path in step A, and, prior to step A, there is prepared in step B a table for teaching which tread pattern would achieve the longest wear resisting period for which accumulated slip rate as the accumulated slip rate is changed. Then, in step C, a tire species which is the most advantageous in terms of wear resisting period is selected by substituting the accumulated slip rate thus calculated for the accumulated slip of the table thus prepared, in a manner similar to that described in the foregoing embodiment.

The invention claimed is:

1. A method of, for each construction vehicle to be controlled, selecting a tread pattern which is the most advantageous in terms of wear resisting period among plural different tread patterns of tire species having different volumes to be worn and each mountable to the vehicle, comprising:

step A of making a vehicle, having a running position sensor for acquiring running position data and a slip rate sensor for acquiring slip rate data for at least one tire mounted thereon, run on a "registered travelling path" preset such that the vehicle runs thereon, acquiring data of a position and data of a slip rate at the position regarding plural positions on the registered travelling path, and calculating, based on the data thus acquired, a "degree of road surface slip" which represents degree at which slip is likely to occur on the registered travelling path;

step B of setting a table which correlates a degree of road surface slip of the registered travelling path, with a tread pattern which is the most advantageous in terms of wear resisting period when the vehicle runs on the registered travelling path, the tread pattern being determined depending on the degree of road surface slip; and step C of applying the degree of road surface slip calculated at step A to the table to select a tread pattern which is the most advantageous in terms of wear resisting period, wherein, upon setting the table at step B, a tread pattern having a relatively small volume to be worn is correlated, as the most advantageous tread pattern in terms of wear resisting period, with a registered travelling path having a relatively high degree of road surface slip, and a tread pattern having a relatively large portion to be worn is correlated with a registered travelling path having a relatively low degree of road surface slip.

2. The method of selecting a tire tread pattern for a construction vehicle of claim 1, wherein the degree of road surface slip is represented by a "slip rate distribution" in which the slip rate range is divided into plural range sections and frequency ratios of the spots on the travelling path corresponding to the respective range sections are plotted therein.

3. The method of selecting a tire tread pattern for a construction vehicle of claim 2, wherein the slip rate range is divided into two ranges comprising a range in which the absolute value of the slip rate does not exceed 5% and a range in which the absolute value of the slip rate exceeds 5%.

4. The method of selecting a tire tread pattern for a construction vehicle of claim 1, wherein the degree of road surface slip is represented by the total sum of areas surrounded, in graph where distances between the starting point and respective spots on the registered travelling path are plotted on the X-axis and respective slip rates measured at the respective spots on the registered travelling path are plotted on the Y-axis, by the line where the slip rate is zero and a line graph of change in the slip rate drawn by linking the plotted respective slip rates.

5. The method of selecting a tire tread pattern for a construction vehicle of claim 1, wherein the running position data and the slip rate data are continuously acquired with a predetermined time interval in a manner synchronous with each other.

6. A system for use in the method of selecting a tire tread pattern for a construction vehicle of claim 1, comprising:

a running position sensor mounted on the vehicle, for acquiring running position data of the vehicle;

a slip rate sensor for acquiring slip rate data of at least one tire mounted on the construction vehicle;
a memory for storing data acquired from these sensors; and
a calculation portion for calculating the degree of road surface slip, based on the data stored in the memory.

7. The system for supporting tire tread pattern selection for a construction vehicle of claim 6, wherein the memory is adapted to store data of the table and the calculation portion is adapted to select a tread pattern which is the most advantageous in terms of wear resisting period, on the basis of the degree of road surface slip and the table.

* * * * *